United States Patent
Westcott

(10) Patent No.: US 10,049,229 B1
(45) Date of Patent: Aug. 14, 2018

(54) SYSTEMS AND METHODS FOR THE MANAGEMENT OF HUDDLE BOARD PARTICIPANTS

(71) Applicant: MASSACHUSETTS MUTUAL LIFE INSURANCE COMPANY, Springfield, MA (US)

(72) Inventor: John Westcott, Southwick, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 124 days.

(21) Appl. No.: 15/155,357

(22) Filed: May 16, 2016

Related U.S. Application Data

(60) Provisional application No. 62/161,397, filed on May 14, 2015.

(51) Int. Cl.
G06F 21/62 (2013.01)
G06Q 10/06 (2012.01)
H04L 9/32 (2006.01)

(52) U.S. Cl.
CPC ....... G06F 21/6218 (2013.01); G06Q 10/063 (2013.01)

(58) Field of Classification Search
None
See application file for complete search history.

(56) References Cited

PUBLICATIONS

An Effective Role Administration Model Using Organization Structure. Oh et al. ACM. pp. 113-137. (Year: 2006).*
Delegation in Role Based Access Control Model for Workflow Systems. Bammigatti et al. IJCSS vol. 2 Issue 2. pp. 1-10. (Year: 2008).*

* cited by examiner

*Primary Examiner* — Venkat Perungavoor
(74) *Attorney, Agent, or Firm* — Eric L. Sophir; Dentons US LLP

(57) ABSTRACT

Systems and methods for managing a list of huddle board participants are disclosed. The huddle collaboration system includes a huddle management system having an authentication module, a data processing module, a huddle board management module, and a module manager, among other suitable components. The system runs an automatic process to update a list of huddle boards and huddle board participants, which includes the process of adding or eliminating team members from the list of participants of one or more huddle boards and/or modifying a dotted line member's permissions within one or more huddle boards. The huddle board management module enables the automatic update of permissions assigned to a team member in one or more huddle boards, in a faster and more accurate manner; therefore enhancing the productivity of the huddle and leveraging the human and information technology resource of the company.

20 Claims, 9 Drawing Sheets

SYSTEMS AND METHODS FOR THE MANAGEMENT OF HUDDLE BOARD PARTICIPANTS

CROSS-REFERENCE TO RELATED APPLICATIONS

This application claims priority to U.S. Provisional Patent Application Ser. No. 62/161,397, entitled "Systems and Methods for the Management of Huddle Board Participants," filed May 14, 2015, which is hereby incorporated by reference in its entirety.

FIELD OF THE DISCLOSURE

The present disclosure relates in general to collaboration systems, and more specifically to systems and methods for the management of a list of huddle board participants.

BACKGROUND

Typically, team members working on one or more projects within a company collaborate together in a micro-meeting or huddle on a regular basis. These huddles allow for collaboration in the sharing of information, discussion of important topics, evaluating project performance, identifying issues, and/or solving problems. Since the introduction of the huddle concept, whiteboards have acted as the traditional tool for storing information collected during an active huddle session. However, a drawback of this huddle methodology is that it may not be possible for all participants in a meeting to be in the same physical location at the same time.

Alternatives to overcome the challenge of gathering team members who may be at different locations for a huddle include the use of a collaboration system integrating one or more collaboration tools, such as conference phone calls, video conferences, Internet relay chat (IRC), emails, and instant messaging, among others. These automated collaboration systems are useful for promoting the information-sharing process between participants, increasing the productivity of the participants by providing means to organize ideas, time, work and efforts, and helping participants to keep track of the project's goals. However, whenever a participant changes his/her role within the organization, manual updates of the groups of participants in a huddle are required, which can be time-consuming and can be prone to human error and oversight.

Therefore, there is a need for systems and methods to automatically manage a group of participants in a huddle to overcome these and other drawbacks of traditional approaches.

SUMMARY

The present disclosure describes systems and methods for the management of huddle board participants.

According to an embodiment, a computer-implemented huddle collaboration system includes different components that dynamically interact with each other through suitable communication networks. In this embodiment, the huddle collaboration system includes one or more internal databases, one or more electronic huddle board databases and one or more human resources databases operatively coupled to a huddle management system, among other components. The huddle management system includes one or more authentication modules, one or more data processing modules, one or more huddle board management modules, and one or more module managers, among other suitable software modules. Further to this embodiment, the huddle collaboration system also includes any suitable user interface through which users such as, huddle leaders and huddle participants, interact with the huddle management system by means of a computing device. The computing device is any computer type device that receives, processes, and/or transmits digital data. The computing device includes a bus which enables the communication between components such as input/output devices, one or more interfaces, one or more memories, one or more storage devices and one or more central processing units, among other system components.

In some embodiments, a computer-implemented huddle collaboration system generates a suitable user interface to provide authorized users with means to manage a list of huddle board participants. In this embodiment, the user interface is a portion of a huddle board that displays a managing board with one or more components of a huddle board, as well as, one or more users associated with the huddle board, such as a board delegate and one or more board members. Further to this embodiment, the user interface provides means for hiding one or more team members, removing or searching for one or more dotted line members, searching for one or more delegate members, and manually including one or more team members to the list of huddle board participants, among other features.

In one embodiment, a computer-implemented huddle collaboration system generates a suitable user interface to provide each user with means to manage their huddle boards. In this embodiment, the user interface displays each user with one or more huddle boards that the user wishes to view by default using a hierarchical organization. Further to this embodiment, the user interface provides means for selecting one or more huddle boards to analyze additional information of the selected huddle board, and searching for one or more huddle boards, one or more individuals and/or one or more teams, among other features.

According to another embodiment, a computer-implemented method for managing a list of huddle board participants includes generating a list of huddle boards and huddle board participants based on information derived from a data feed provided by a human resources database, merging departments when needed, generating a list of huddle boards based on information derived from an electronic huddle board database, analyzing and updating the huddle boards from the list derived from the latest data feed received, generating a list of participants based on information derived from the electronic huddle board database, analyzing and updating the participants of the huddle board, updating the parent and child links of the huddle board, removing the analyzed huddle board from the list of huddle boards derived from information stored in the electronic huddle board database, identifying the remaining huddle boards in the list of huddle boards derived from information stored in the electronic huddle board database, and marking those remaining huddle boards as inactive in the electronic huddle board database.

Further to this embodiment, a computer-implemented method for automatically updating a huddle board includes the following steps: analyzing each huddle board from a list of huddle boards generated from information derived from the latest data feed provided by a human resources database, and determining whether the analyzed huddle board has a corresponding huddle board in the list of huddle boards generated from information derived from an electronic huddle board database. If there is no corresponding huddle board in the electronic huddle board database, then the method also includes the step of creating a new huddle board in the electronic huddle board database. If there is a corresponding huddle board in the electronic huddle board database, and the name of the huddle board has changed, then the method also includes the step of updating the huddle board's name field in the electronic huddle board database.

In some embodiments, a computer-implemented method for automatically updating a list of huddle board participants includes the following steps: analyzing each team member from the list of huddle board participants derived from the latest data feed provided by a human resources database, and determining whether the analyzed huddle board participant is in the list of huddle board participants generated from information derived from an electronic huddle board database. If the huddle board participant is not in the list of huddle board participants generated from information derived from the electronic huddle board database, then the method also includes the step of adding an entry for the huddle board participant in the electronic huddle board database. If the huddle board participant is in the list of huddle board participants generated from information derived from the electronic huddle board database, then the method also includes the step of determining whether the huddle board participant is in an organizational chart (also known as an "org chart or organization chart") of the company. If the huddle board participant is in the organizational chart of the company, then the method also includes the step of adding the huddle board participant to the list of huddle board participants. However, if the huddle board participant is not in the organizational chart of the company, then the method also includes the steps of removing the huddle board participant from the list of huddle board participants in the huddle board and removing the huddle board participant from the list of members in the organizational chart of the human resources database.

Systems and methods for managing a list of huddle board participants enable the automatic update of permissions assigned to a team member in one or more huddle boards, in a faster and more accurate manner; therefore allowing team members to remotely connect to huddles in a consistent way, which reinforces the company's management system approach across multiple levels in the organization. In addition, the system enhances the productivity of the huddle and leverages the human and information technology resource of the company. Numerous other aspects, features and benefits of the present disclosure may be made apparent from the following detailed description taken together with the drawing figures.

In one embodiment, a system comprises an electronic huddle board data store configured to store a record of each huddle board; and a server communicatively coupled to the electronic huddle board data store and configured to identify one or more huddle board participants from a human resources data store who are identified in the electronic huddle board data store as being associated with at least one huddle board record, determine a permission level for each huddle board participant for each huddle board record, determine any changes to an organization chart retrieved from a data store, update each permission level for each huddle board participant for each huddle board record based upon any changes to the organization chart involving the huddle board participant, store each updated permission level in the electronic huddle board database, and transmit data describing how to render one or more huddle boards associated with the one or more huddle board records to a huddle board participant based upon the updated permission level.

In another embodiment, a computer-implemented method comprises generating, by a server, a record for each huddle board record derived from an electronic huddle board data store; obtaining, by the server, a set of records identifying one or more huddle board participants derived from a human resources data store who are identified in the electronic huddle board data store as being associated with at least one huddle board record; determining, by the server, a permission level for each huddle board participant for each huddle board record; determining, by the server, any changes to an organization chart retrieved from a data store; updating, by the server, each permission level for each huddle board participant for each huddle board record based upon any changes to the organization chart involving the huddle board participant; storing, by the server, each updated permission level in the electronic huddle board data store; and transmitting, by the server, data describing how to render one or more huddle boards associated with one or more huddle board records to a huddle board participant based upon the updated permission level.

In yet another embodiment, a computer implemented method comprises receiving, by a server, a request for a huddle board participant to access an electronic huddle board session; obtaining, by the server, a record of the huddle board participant from a human resources data store; querying, by the server, an electronic huddle board data store to determine whether the huddle board participant is entitled to access the electronic huddle board session; and updating, by the server, the electronic huddle board data store based upon changes in an organization chart of a company employing the huddle board participant.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
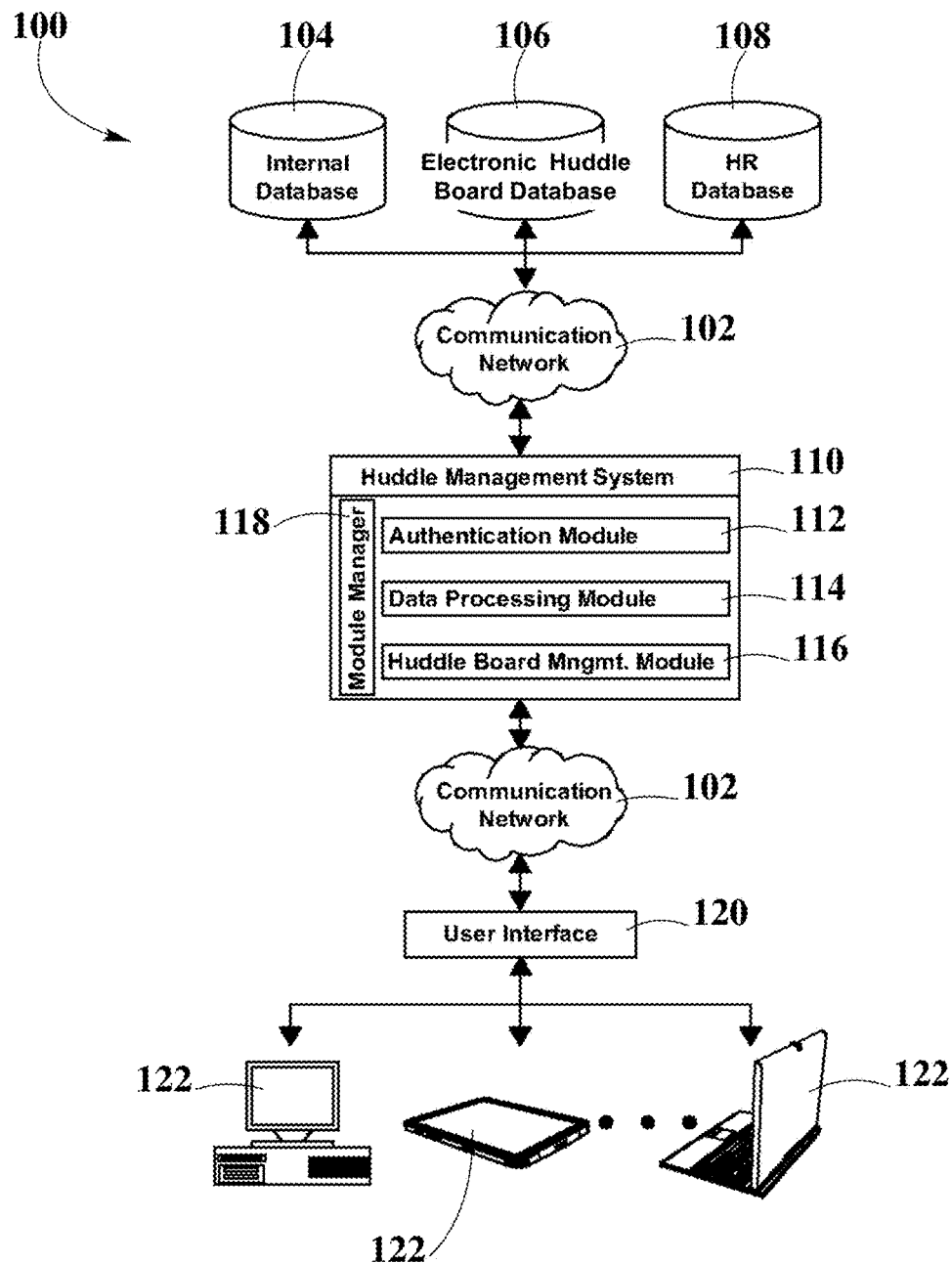
FIG. 1 is a block diagram illustrating a system architecture for a remote huddle collaboration system, according to an embodiment.

The present disclosure herein is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Active huddle" refers to a huddle board which a leader has started and to which one or more participants join remotely through a huddle collaboration system.

"Dotted line member" or non-subordinate member refers to a team member who is included in a huddle board by the huddle board's leader, even though the team member does not officially work for the huddle board's leader according to an organizational chart of the company.

"Huddle" refers to a group of two or more members of a team, brought together on a regular basis to recognize outstanding contributions, evaluate performance, identify issues and solve problems collaboratively.

"Huddle board" refers to a user interface generated by a huddle collaboration system which displays the content collected during a huddle in the form of one or more sub-applications.

"Leader" refers to a team member that initiates and manages a huddle session. A leader has an additional set of permissions to manage a huddle board, including for example, the ability to create huddle boards, configure or otherwise modify a huddle session, among other permissions.

"Sub-application" refers to a software tool that enables remote collaboration between authenticated team members in a digital huddle environment.

"Team member" refers to a user that participates in remote huddle collaboration by means of a computing device. The user is part of the team performing tasks of a particular project.

"Team Member's Profile" refers to the attributes which are associated with each team member such as the team member's position within the company, their professional certifications and/or qualifications, as well as other attributes.

The present disclosure describes systems and methods for managing huddle board participants. The system runs an automatic process on a regular basis to update a list of huddle board participants. This includes the process of adding or eliminating team members from the list of participants of one or more huddle boards and/or modifying a dotted line member's permissions within one or more huddle boards.

FIG. 1 is a block diagram illustrating a system architecture for a remote huddle collaboration system, according to an embodiment. In FIG. 1, system architecture 100 further includes one or more internal databases 104, one or more electronic huddle board databases 106, one or more human resources (HR) databases 108, one or more huddle management systems 110, one or more client computing devices 122, and a plurality of servers (not shown in FIG. 1) having the necessary hardware and software to implement any of the aforementioned system components that require implementation via such necessary hardware and software, among others. In some embodiments, huddle management system 110 further includes one or more authentication modules 112, one or more data processing modules 114, one or more huddle board management modules 116, one or more module managers 118 and any other software module(s) required for the proper operation of huddle management system 110.

In FIG. 1, huddle management system 110 is operatively coupled to internal database 104, electronic huddle board database 106, and human resources database 108 through communication networks 102. Communication network 102 refers to any communication network between computers such as, for example, intranets, local area networks (LANs), virtual private networks (VPNs), wide area networks (WANs) and the internet, among others. In some embodiments, each software module within huddle management system 110 is implemented as code running on a processing unit configured for running related algorithms or computer executable program instructions that are executed by a server, a single computer, or multiple computers within a distributed configuration. In these embodiments, the processing unit is configured to interact with one or more software modules of the same or different type, operating within huddle management system 110. Further to these embodiments, each processing unit includes a processor with computer-readable medium such as, for example, random access memory (RAM), coupled to the processor. Examples of suitable processor types include a microprocessor, an application specific integrated circuit (ASIC) and a field programmable object array (FPOA), among others. Examples of firmware and/or hardware and associated software enabling functionality of the aforementioned system components will be further described in FIG. 2, below.

In FIG. 1, internal database or data store 104 is implemented as a relational database that provides the functions of fetching, indexing, and storing data. In some embodiments, internal database 104 stores data generated by one or more software modules operating within huddle management system 110. In these embodiments, internal database 104 provides aforementioned generated data and other stored data and files to one or more software modules within huddle management system 110 for further analysis. In an example, the aforementioned generated data can be the data and files uploaded by a user, such as, a huddle leader or a huddle participant, to one or more huddle boards; an organizational chart (also known as an "org chart or organization chart") of the company showing the positions of each team member and the existing relationships between them; and the like.

In FIG. 1, electronic huddle board database or data store 106 is implemented as a relational database that provides the functions of fetching, indexing, and storing data. In some embodiments, electronic huddle board database 106 stores data generated by one or more software modules operating within huddle management system 110. In these embodiments, electronic huddle board database 106 provides aforementioned data and other stored data and files to one or more software modules within huddle management system 110 for further analysis. Example of the aforementioned data include: the profile of each huddle board including an identification (ID) field which identifies each huddle board within electronic huddle board database 106; the profile of each team member including a unique ID which identifies each team member within electronic huddle board database 106; the links between one or more huddle boards and one or more team members via one or more ID fields; and the link between huddle boards to determine hierarchy; among others.

The huddle board may be generated and stored within the electronic huddle board database, or a user may generate an ad-hoc board that can be merged into the electronic huddle board database, converted to a format appropriate for the electronic huddle board database, and linked to other huddle boards with the electronic huddle board database. As a result, the huddle board does not need to be generated in the huddle management system in order to be integrated and comply with the processes set forth herein.

In FIG. 1, human resources database or data store 108 is implemented as a relational database that provides the functions of fetching, indexing, and storing data. In some embodiments, human resources database 108 stores data generated by one or more software modules operating with other human resources systems. In these embodiments, human resources database 108 provides the aforementioned data and other stored data and files to one or more software modules within huddle management system 110 for further analysis. In some embodiments, human resources database 108 stores a data feed which is provided then to one or more software modules operating within huddle management system 110, to update the information stored in electronic huddle board database 106. In these embodiments, the ID fields provide means for associating information related to the same huddle board or team member and stored within electronic huddle board database 106, internal database 104 and/or human resources database 108.

In exemplary embodiments, internal database 104, electronic huddle board database 106 and human resources database 108 grant access to huddle management system 110 when needed and can be implemented through database management systems (DBMS) such as, for example, MySQL, PostgreSQL, SQLite, SAP, Microsoft SQL Server, Microsoft Access, Oracle, PeopleSoft, dBASE, FoxPro, IBM DB2, LibreOffice Base, FileMaker Pro and/or any other type of database that can organize collections of data. In these embodiments, internal database 104, electronic huddle board database 106 and human resources database 108 can be implemented using application protocols for accessing and maintaining distributed directory information services or data feeds such as, for example, Lightweight Directory Access Control (LDAP), among others.

In some embodiments, huddle management system 110 generates user interface 120 which requests and/or collects information from one or more client computing devices 122 through which users interact with user interface 120 via an input/output (I/O) device such as, a touch screen or a mouse, a keyboard and/or a keypad working in concert with a display, and others. In these embodiments, authentication module 112 receives the user's credentials through client computing device 122 and validates those credentials in order to assign permissions to access, start, edit, and/or otherwise manage one or more huddle boards. Further to these embodiments, data processing module 114 processes the information collected during an active huddle session and stores this information at internal database 104, when needed.

In some embodiments, data processing module 114 is further configured to automatically retrieve information requested by one or more client computing devices 122 and/or one or more software modules. In these embodiments, this information is obtained from internal database 104, electronic huddle board database 106 and/or human resources database 108. In other embodiments this information is obtained from the operation of one or more software modules within huddle management system 110.

In some embodiments, huddle board management module 116 runs an automatic process to update a list of huddle board participants, which may include the process of adding or eliminating team members from the list of participants of one or more huddle boards, and/or modifying a dotted line member's permissions within one or more huddle boards. In these embodiments, module manager 118 interacts with one or more software modules operating within huddle management system 110 to control the operation of the huddle collaboration system and process requests from one or more client computing devices 122 and/or one or more software modules, among other activities.

Figure 2:
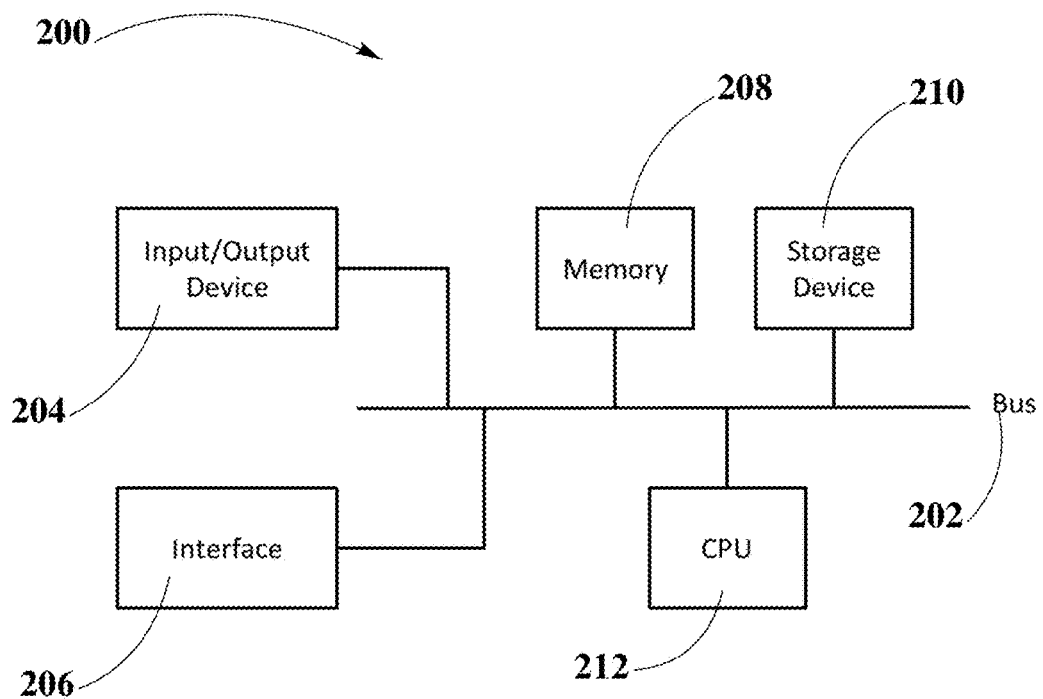
FIG. 2 is a block diagram illustrating an exemplary computing device in which one or more embodiments of the present disclosure may operate, according to an embodiment.

FIG. 2 is an exemplary computing device 200 in which one or more embodiments of the present disclosure may operate. In one embodiment, computing device 200 includes bus 202, input/output (I/O) device 204, communication interface 206, memory 208, storage device 210 and central processing unit (CPU) 212. In another embodiment, computing device 200 includes additional, fewer, different, or differently arranged components than those illustrated in FIG. 2.

In FIG. 2, bus 202 is in physical communication with I/O device 204, communication interface 206, memory 208, storage device 210 and central processing unit 212. Bus 202 includes a path that permits components within computing device 200 to communicate with each other. Examples of I/O device 204 include any suitable peripheral and/or other mechanisms that enable a user to input information to computing device 200 such as, for example, a keyboard, a computer mouse, a track ball, other input buttons, touch screens, voice recognition devices, biometric mechanisms devices and the like. I/O device 204 also includes a mechanism that outputs information to the user of computing device 200 such as, for example, a display, a light emitting diode (LED), a printer, a speaker and the like.

In FIG. 2, communication interface 206 is a device that enables computing device 200 to communicate with other computing devices and/or systems through communication networks (not shown in FIG. 2), such as, for example, Wi-Fi cards, Ethernet and the like. Communication networks refer to any suitable communication network between computers that allows computing device 200 to exchange data, such as, for example, intranets, local area networks (LANs), virtual private networks (VPNs), wide area networks (WANs), the internet and the like. Memory 208 is a device that stores software programs or data used in computing device 200, such as, for example, random access memory (RAM), read-only memory (ROM), flash memory and the like. Storage device 210 is a device that stores and retrieves information, such as, for example, magnetic and/or optical recording medium, Ferro-electric RAM (F-RAM) hard disks, solid-state drives, floppy disks, optical discs and the like. In one embodiment, memory 208 and storage device 210 store information and instructions for execution by one or more central processing units 212. Examples of suitable central processing units 212 include a microprocessor, an application specific integrated circuit (ASIC), a field programmable object array (FPOA) and the like. In this embodiment, central processing unit 212 interprets and executes instructions retrieved from memory 208 and storage device 210.

In some embodiments, computing device 200 can be implemented as part of a server, a client computing device and the like. Examples of suitable implementations of computing device 200 include servers, authorized client computing devices 122, smartphones, desktop computers, laptop computers, tablet computers, PDAs and other types of processor-controlled devices that receive, process, and/or transmit digital data. In an example, computing device 200 performs certain operations that are required for the proper operation of system architecture 100. Suitable computing devices 200 perform these operations as a result of central processing unit 212 executing software instructions contained within a computer-readable medium, such as within memory 208.

In one embodiment, the software instructions of the system are read into memory 208 from another memory location, such as from storage device 210, or from another computing device 200 (e.g., client computing devices 122 and the like) via communication interface 206. In this embodiment, the software instructions contained within memory 208 instructs central processing unit 212 to perform processes that will be further described in FIG. 3, below. Alternatively, hardwired circuitry may be used in place of or in combination with software instructions to implement the processes described herein. Thus, implementations described herein are not limited to any specific combinations of hardware circuitry and software.

Figure 3:
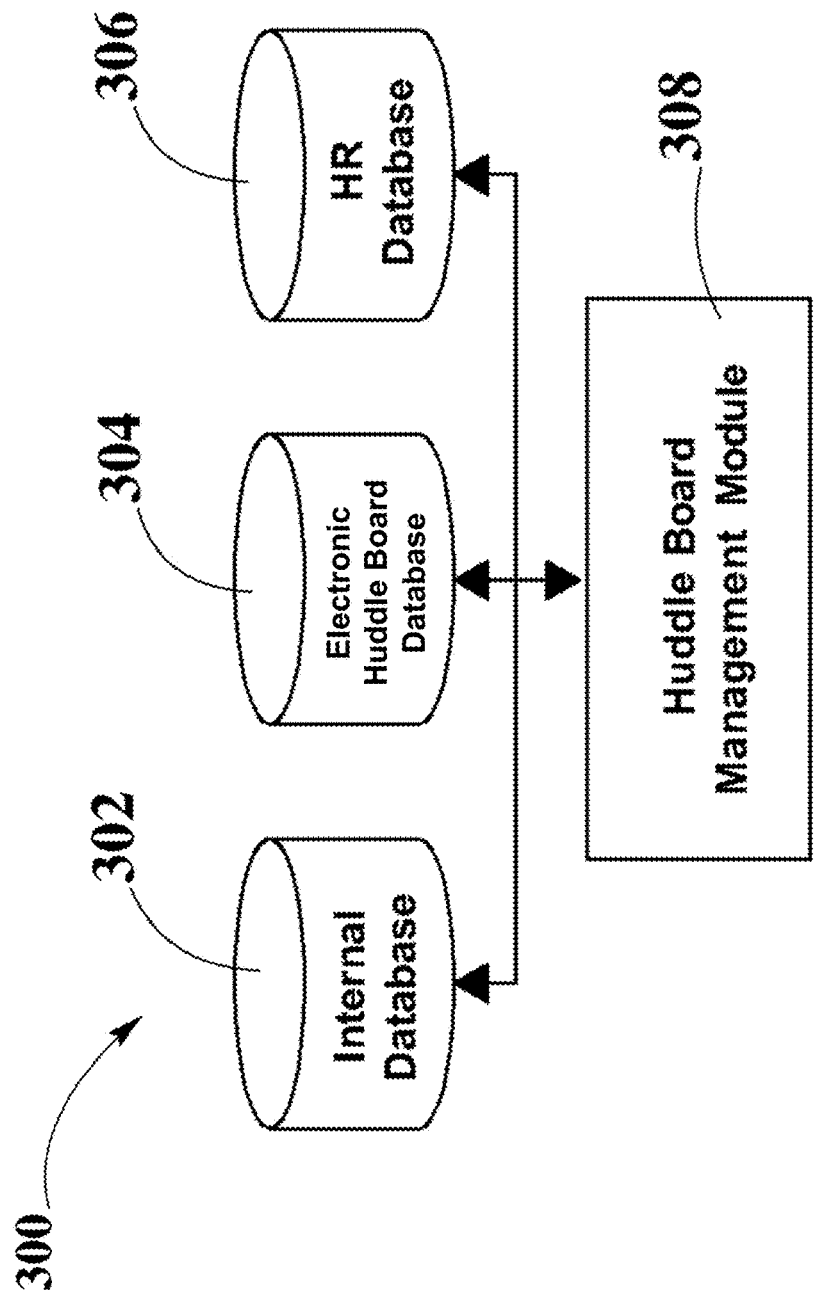
FIG. 3 is a block diagram illustrating a sub-system of a system architecture pertaining to a huddle management system, according to an embodiment.

FIG. 3 is an exemplary block diagram of a sub-system of system architecture 100 pertaining to a huddle management system such as, for example, huddle management system 110 of FIG. 1. In FIG. 3, sub-system 300 includes internal database 302, electronic huddle board database 304, human resources (HR) database 306, and huddle board management module 308. It should be understood that huddle management system 110 can include less components, more components, or different components depending on the desired analysis goals. In an example referring to FIG. 1, huddle board management module 308 is implemented as huddle board management module 116 within system architecture 100. In FIG. 3, huddle board management module 308 is operatively coupled to and in two-way communication with internal database 302, electronic huddle board database 304 and human resources database 306.

In FIG. 3, huddle board management module 308 is implemented as one or more computer software modules that include programmatic rules or logic for executing/running different user interfaces to update a list of huddle board participants which may include the process of adding or eliminating team members from the list of participants of one or more huddle boards and/or modifying a dotted line member's permissions with respect to one or more huddle boards. According to some embodiments, huddle board management module 308 receives a feed of data from human resources database 306. In this embodiment, huddle board management module 308 analyzes the latest data feed received to identify a list of huddle boards and the corresponding list of participants for each huddle board.

In some embodiments, huddle board management module 308 then compares these previously identified lists of huddle boards and huddle board participants, with the information related to those huddle boards and huddle board participants stored in electronic huddle board database 304 and with the organizational chart of the company stored in internal database 302. In these embodiments, electronic huddle board database 304 includes the following: the profile of each huddle board including an identification (ID) field which identifies each huddle board within electronic huddle board database 304; the profile of each team member including a unique ID which identifies each team member within electronic huddle board database 304; the links between one or more huddle boards and one or more team members via one or more ID fields; and the link between huddle boards to determine hierarchy; among others. Further to these embodiments, these ID fields provide means for associating information related to the same huddle board or huddle board participant within electronic huddle board database 304, internal database 302, and/or human resources database 306. In one embodiment, the organizational chart of the company can be automatically updated in internal database 302 as the participants change their position within the company.

The electronic huddle board database or the huddle management system can periodically (e.g., hourly, daily, weekly) determine the status of the organization chart and whether there are any changes from a previous version. Alternatively, the electronic huddle board database or the huddle management system can make this determination on a real-time basis, which can be based upon a data feed from a database that alerts as to any changes or the electronic huddle board database or huddle management system can detect when a change has been made.

In an embodiment, huddle board management module 308 uses state of the art data mining and other data processing tools to identify any changes in the current list of huddle boards, in the current list of participants associated with each huddle board, and in each dotted line member's current permissions within one or more huddle boards. In this embodiment, huddle board management module 308 then performs any necessary modifications of the huddle boards and the list of huddle board participants. As a result, the information related to the modified huddle boards and the list of huddle board participants stored in electronic huddle board database 304 is automatically updated.

Figure 4:
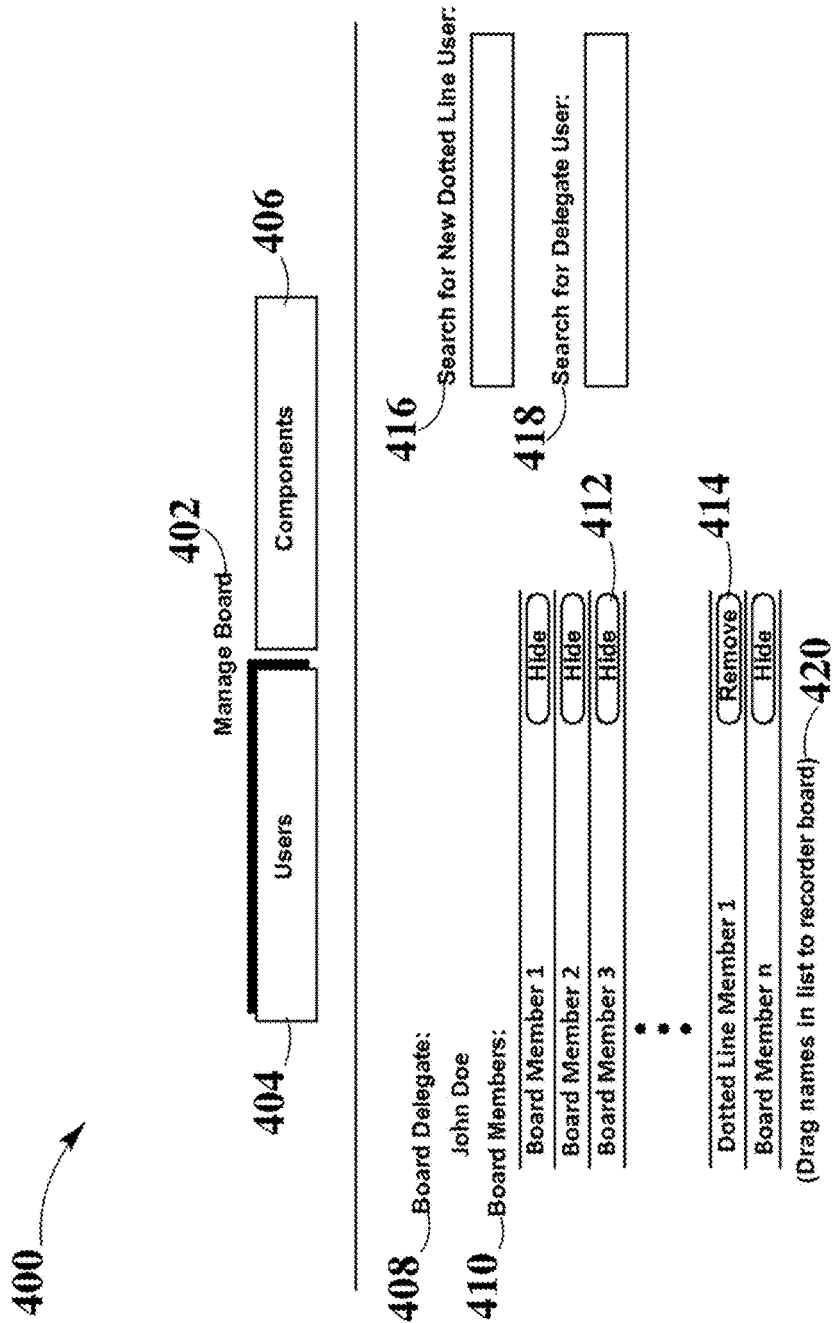
FIG. 4 is a diagram illustrating an exemplary user interface of a list of huddle board participants, according to an embodiment.

FIG. 4 is an exemplary user interface illustrating an exemplary list of participants associated with a huddle board. In some embodiments, an authorized user can interact with user interface 400 through one or more client computing devices such as, for example, computing device 200. In an example, exemplary user interface 400 is generated by a huddle collaboration system as shown in FIG. 1, which includes components of the exemplary operating environments of FIGS. 1-3.

In FIG. 4, user interface 400 provides authorized users with means to manage a list of huddle board participants. In FIG. 4, managing board 402 is a portion of a huddle board that displays within user field 404 one or more users associated with the huddle board. In one embodiment, managing board 402 additionally displays one or more components 406 of the huddle board.

In FIG. 4, user field 404 of managing board 402 illustrates a board delegate 408 which corresponds to the huddle leader, and one or more board members 410 which correspond to the huddle board's other participants. In one embodiment, board members 410 include one or more team members, according to information derived from an electronic huddle board database; and one or more dotted line members which are included in the huddle board by board delegate 408.

In this embodiment, user interface 400 includes hide button 412 and remove button 414 that enables board delegate 408 to hide one or more team members from the organizational chart within the electronic huddle board database, and/or remove one or more dotted line members, when needed. In addition, user interface 400 includes a new dotted line member(s) search field 416 and delegate member(s) search field 418 that allow authorized users to search for new dotted line members, search for delegate members, and drag 420 the name of one or more team members to add them to the list of huddle board participants, among other features.

Further to this embodiment, user interface 400 is configured to dynamically update the links between huddle boards and team members whenever board delegate 408 initiates hide button 412 to hide a team member from the organizational chart within the electronic huddle board database and/or initiates remove button 414 to remove a dotted line member, among others. Similarly, whenever board delegate 408 drags 420 the name of a team member to the list of huddle board participants, the links between huddle boards and team members is dynamically updated, which directly affects the sort order stored in the electronic huddle board database.

Figure 5A:
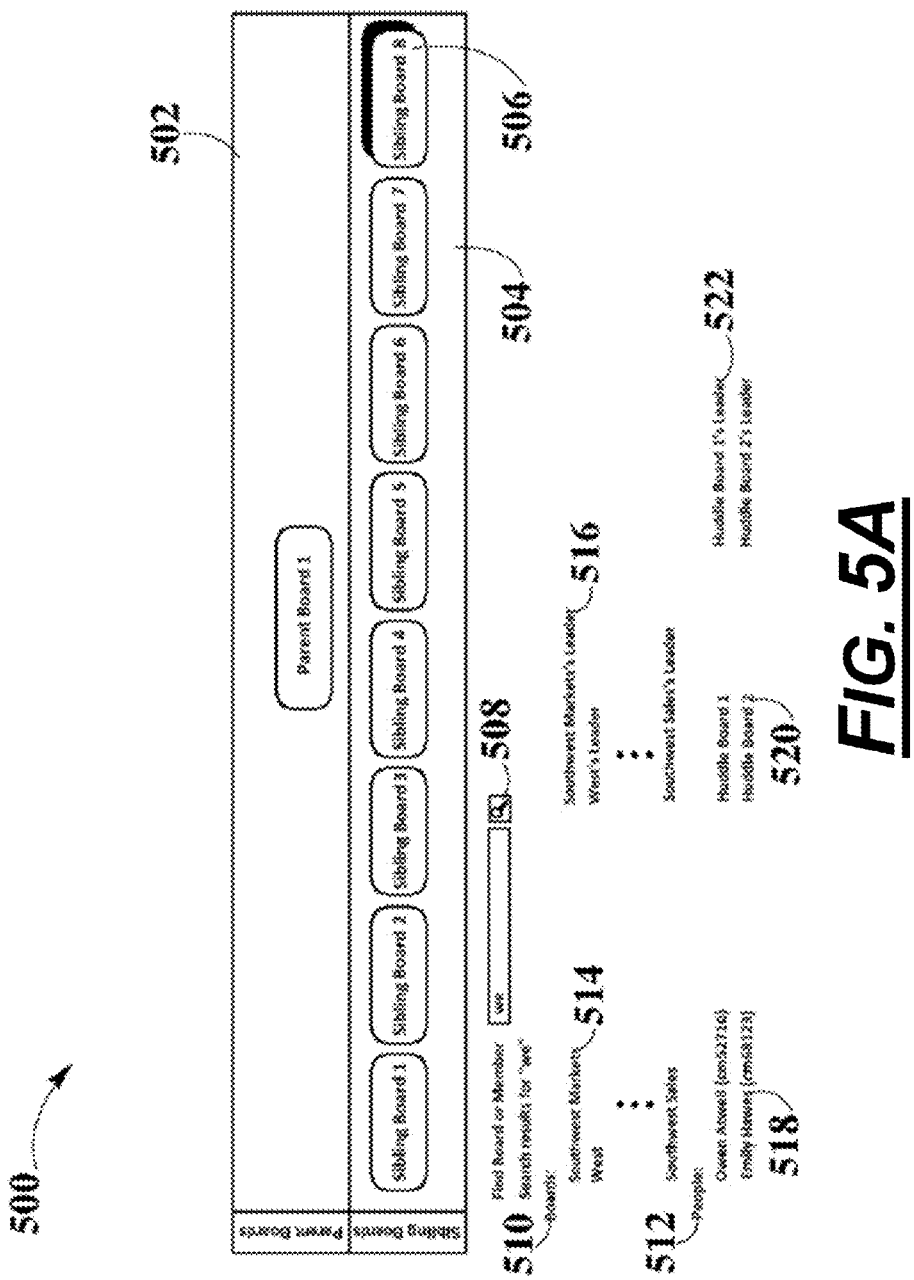
FIG. 5A is a an exemplary user interface for managing a team member's huddle board, according to an embodiment.

FIG. 5A is an exemplary user interface for managing a team member's huddle boards. In some embodiments, an authorized user can interact with user interface 500 through one or more client computing devices such as, for example, computing device 200. In an example, exemplary user interface 500 is generated by a huddle collaboration system as shown in FIG. 1, which includes components of the exemplary operating environments of FIGS. 1-3.

In some embodiments, user interface 500 provides users, such as a huddle leader and a huddle participant, with means to manage their huddle boards. According to some embodiments, user interface 500 displays one or more huddle boards with which they are participants. In these embodiments, whenever a user is participating in multiple huddle boards or whenever a user is a leader of one or more huddle boards, user interface 500 presents the user with one or more huddle boards the user wishes to view by default. In an example, the aforementioned huddle boards are presented to the user using a hierarchical organization. In this embodiment, the user's huddle boards are characterized as a parent board 502 or a sibling board 504 depending on the hierarchy that is determined by the existing links between one huddle board and another. In an example, the existing links between one huddle board and another can be derived from an electronic huddle board database.

Figure 5B:
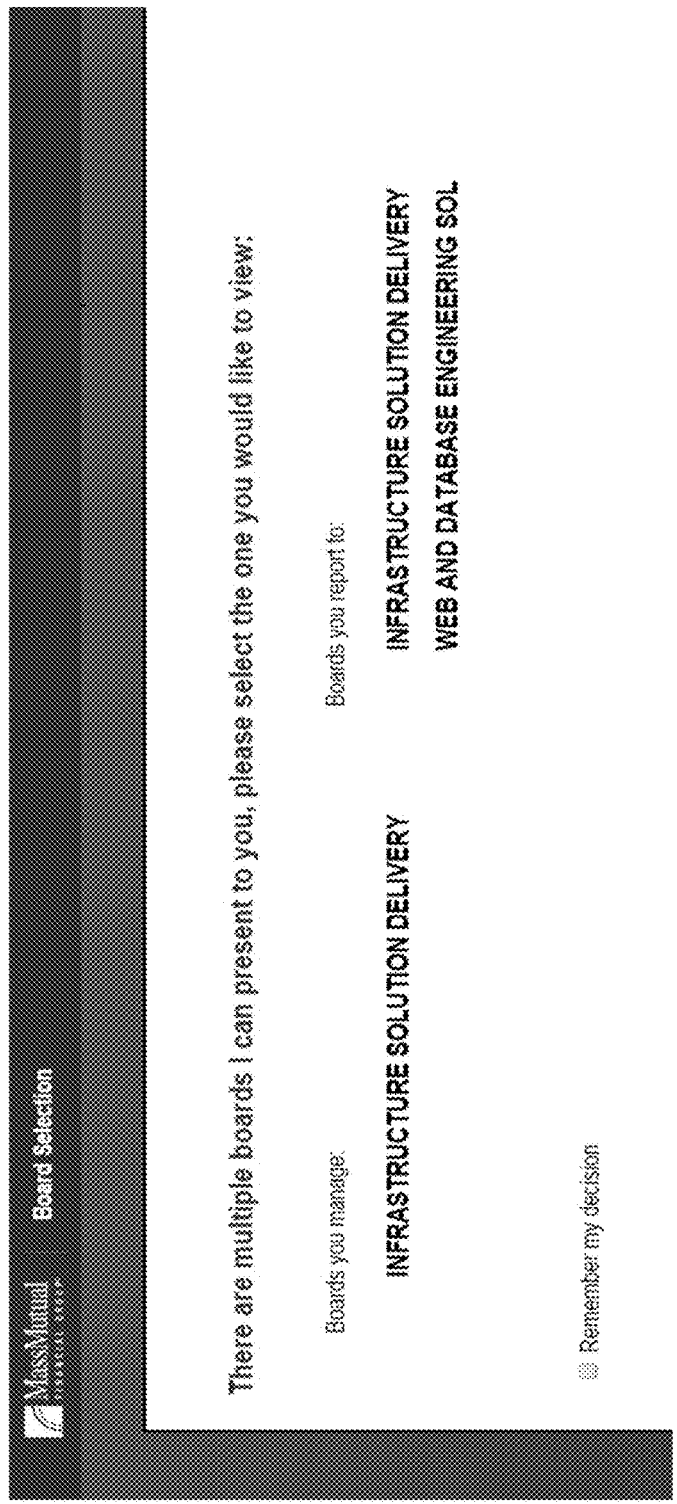
FIG. 5B is an exemplary user interface for managing a team member's huddle board, according to an embodiment.

Referring to FIG. 5B, an exemplary graphical user interface configured to be displayed on a computing device is shown. The graphical user interface has a landing page, whereby a user can be a member or manager of multiple boards, and the graphical user interface presents an option as to which to view on login. Upon entering proper credentials, the user is presented with a graphical user interface for display on the computing device of the user. The system determines which boards the user has access and generates the user interface for presentation on the computing device to display the different boards available to the user. The system determines the current status of the organization chart, determines the user's role within the organization chart, determines a level of access associated with that role or items associated with that role, identifies the boards associated with the level of access or items associated with that role, and presents to the user the available boards for which the user has accessibility. In this example, the user manages the board for "Infrastructure Solution Delivery," and the user reports to the boards for "Infrastructure Solution Delivery" and "Web and Database Engineering SOL." The user can select a desired board on the graphical user interface, and a message is transmitted requesting that the selected board is displayed accordingly. The user may also select for the system to remember the decision such that future authentication sessions will direct the graphical user interface to automatically present the selected board.

A computing device having a graphical user interface can be associated with an acting manager. The acting manager may not be listed as a manager in the organization chart, but may have a predetermined level of control of a huddle board, thereby overriding the requirements of the management module.

The user can interact with user interface 500 via an input device, to select buttons 506 associated with one of the huddle boards and analyze additional information of the selected huddle boards, when needed. Users can also select search button 508 for searching one or more huddle boards presented to the user in huddle board list 510 and/or one or more individuals and/or teams presented to the user in people's list 512. Such searching may include the ability to use keyword strings to traverse the organizational hierarchy structure. In one embodiment, search results include name field 514 identifying the name of each huddle board in huddle board list 510 found matching the keyword strings, as well as, leader field 516 identifying the leader associated with a particular huddle board in huddle board's list 510.

In some embodiments, search results also include people name field 518 identifying the name of individuals and/or teams in people list 512 found matching the keyword strings, a huddle board field 520 identifying the name of the huddle board with which each individual from people list 512 is participant, and a leader name field 522 identifying the leader associated with a particular huddle board in which each individual or team from people list 512 reports to.

Figure 6:
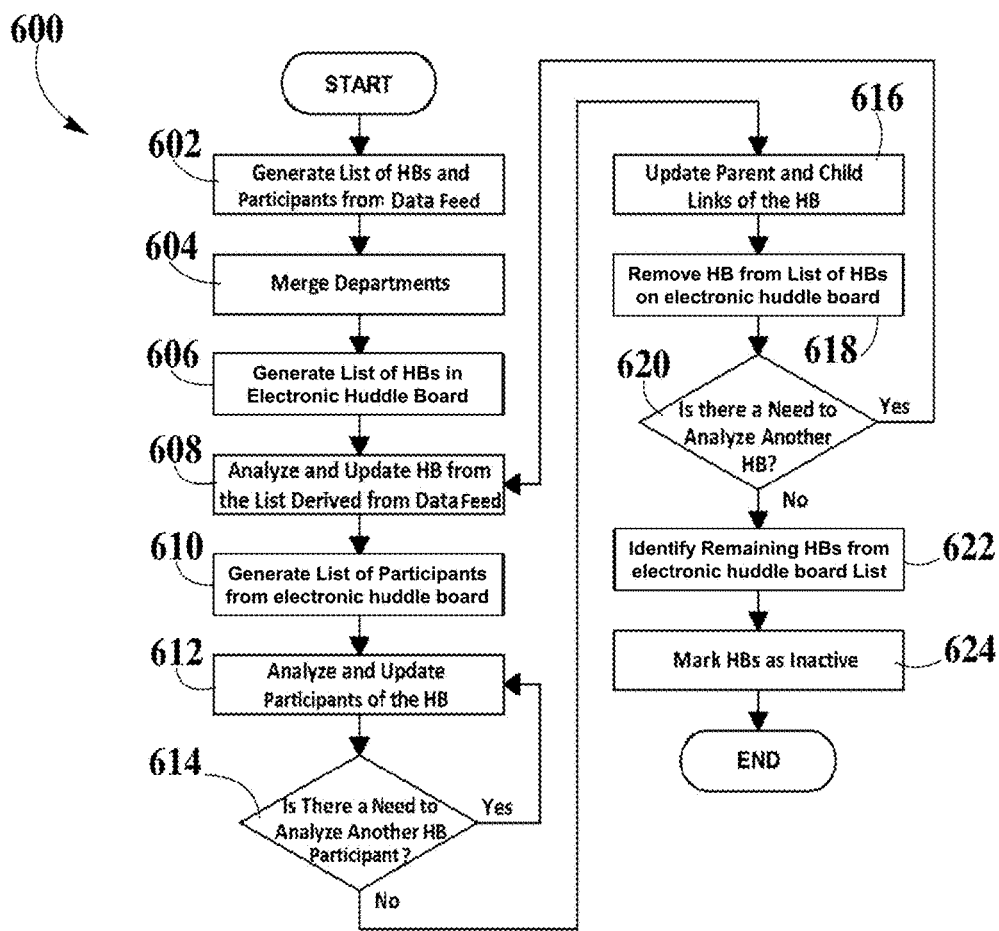
FIG. 6 is a flowchart of a method for managing a list of huddle board participants, according to an embodiment.

FIG. 6 is a flowchart of a method for managing a list of huddle board participants, according to another embodiment. In this embodiment, a huddle board management module operating within a huddle management system of a huddle collaboration system analyzes the information received from the latest feed of data generated by a human resources database, to identify a list of huddle boards and the corresponding list of participants for each huddle board. Then, the huddle board management module compares this information with the information stored in an electronic huddle board database and with the organizational chart of the company stored within the internal database. Further to this embodiment, the huddle board management module identifies any changes in the list of huddle boards, in the list of participants associated with each huddle board and in each dotted line member's permissions within one or more huddle boards. The huddle board management module runs an automatic process to perform the necessary modifications in the huddle boards according to the previously identified changes, consequently updating the electronic huddle board database information.

A plurality of steps included in method 600 may be performed by one or more computing devices such as, for example, computing device 200. Method 600 is implemented with components of the exemplary operating environments of FIGS. 1-5. The steps of method 600 are embodied in a computer readable medium containing computer readable code such that the steps are implemented when the computer readable code is executed by a computing device. In some implementations, certain steps of method 600 can be combined, performed simultaneously, or in a different order, without deviating from the objective of method 600.

Method 600 begins at step 602, when a huddle board management module generates a list of huddle boards (HBs)

and a corresponding list of participants for each huddle board, using state of the art data mining and other data processing tools. These lists are generated based on information derived from the latest data feed provided by a human resources database. In an embodiment, the generated lists include one huddle board per geographical area of each department within the company. Method 600 then advances to step 604.

At step 604, the huddle board management module identifies in the list generated in step 602 the huddle boards pertaining to different geographical areas of the same department within the company. In this embodiment, the analysis module merges those huddle boards pertaining to different geographical areas of the same department, into a single huddle board, when needed. Method 600 then advances to step 606.

At step 606, the huddle board management module generates a list of huddle boards based on the information derived from an electronic huddle board database, using data mining and other data processing tools. Method 600 then advances to step 608.

At step 608, the huddle board management module analyzes each huddle board from the merged list of huddle boards obtained during step 604, to identify one or more modifications that have to be applied to the list of huddle boards. In this embodiment, the huddle board management module compares the merged list of huddle boards obtained during step 604, with the list of huddle boards generated in step 606 and updates the information related to each huddle board, according to the identified modifications. The process of updating each huddle board will be further described in FIG. 7, below. Method 600 then advances to step 610.

At step 610, the huddle board management module generates a list of the huddle board participants associated with the huddle board analyzed and updated in step 608. In one embodiment, this list is derived from the information stored in the electronic huddle board database. Method 600 then advances to step 612.

At step 612, the huddle board management module analyzes a huddle board participant from the merged list of huddle board participants obtained in step 604, to identify one or more modifications that have to be applied to the list of huddle board participants associated to the huddle board analyzed and updated in step 608. In this embodiment, the huddle board management module compares the merged list of huddle board participants obtained during step 604, with the list of huddle board participants generated in step 610 and with the organizational chart of the company. Further to this embodiment, the huddle board management module updates the list of huddle board participants, according to the identified modifications. The process of updating each list of huddle board participants will be further described in FIG. 8, below. Method 600 then advances to step 614.

At step 614, the huddle board management module determines whether there is a need to analyze another participant of the huddle board analyzed in step 608, to identify one or more modifications that have to be applied to the list of huddle board participants. If there is a need to analyze another participant of the huddle board analyzed and updated in step 608, then method 600 advances to step 612 to select, analyze and update at least one more participant of the huddle board analyzed in step 608. Otherwise, method 600 advances to step 616.

At step 616, the huddle board management module updates the parent links and the child links of the huddle board analyzed and updated in step 608, to define the huddle board hierarchy in the electronic huddle board database. Method 600 then advances to step 618.

At step 618, the huddle board management module removes the huddle board analyzed and updated in step 608 from the list of huddle boards obtained during step 606. Method 600 then advances to step 620.

At step 620, the huddle board management module determines if there is a need to analyze another huddle board from the merged list of huddle boards obtained in step 604. If there is a need to analyze another huddle board from the merged list obtained during step 604, then method 600 advances to step 608 to select, analyze and update at least one more huddle board from the merged list obtained during step 604. Otherwise, method 600 advances to step 622.

At step 622, the huddle board management module identifies the remaining huddle boards from the list of huddle boards obtained during step 606, which have not been analyzed and updated in step 608. Method 600 then advances to step 624.

At step 624, the huddle board management module marks all the huddle boards identified in step 622 as inactive in the electronic huddle board database, because they are no longer in the latest data feed received. Then, method 600 ends.

By executing method 600 through the exemplary operating environments shown in FIGS. 1-5, data mining techniques and other data processing tools can be implemented for a more efficient and faster processing of larger data sets. Method 600 enables the automatic update of permissions assigned to a team member in one or more huddle boards, to be processed in a far-reaching manner than possible with human-intervention data-driven analysis. In this way, efficiencies are created by providing means for enhancing the productivity of the huddle, as compared to conventional processes employing established methodology. These features allow performing large work such as time consuming analysis and updates of huddle boards and huddle board participants, in a more efficient manner than other approaches such as manual work performed by humans.

Figure 7:
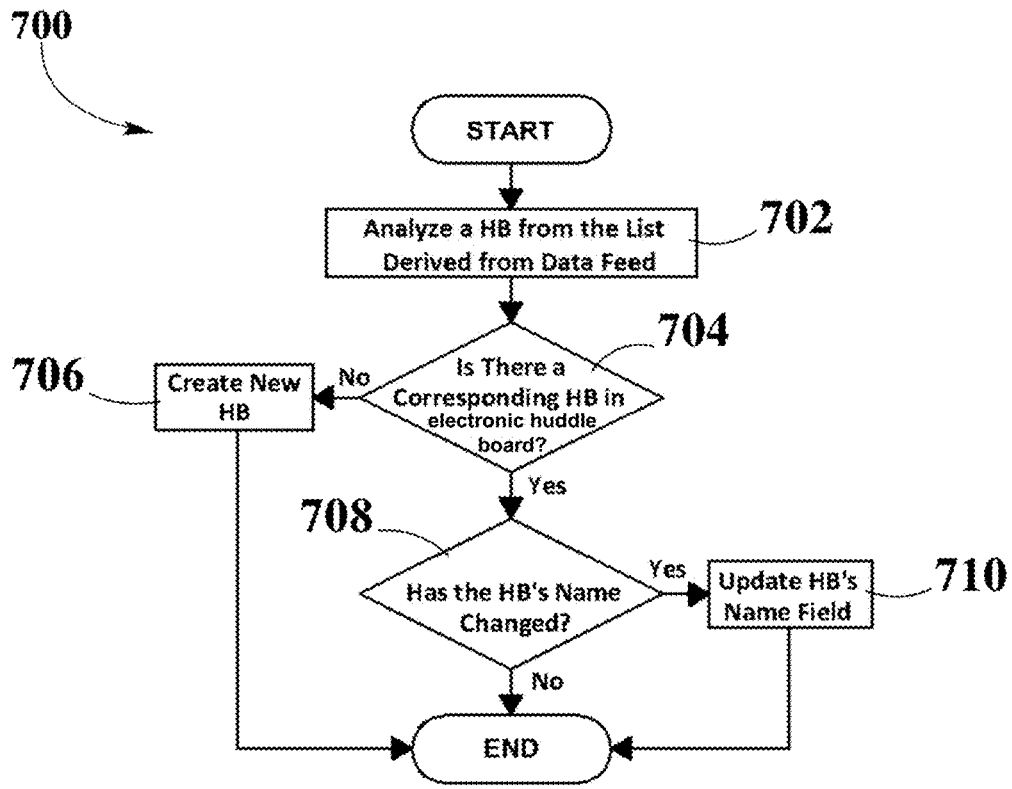
FIG. 7 is a flowchart of a method for automatically updating a huddle board, according to an embodiment.

FIG. 7 is a flowchart of a method for automatically updating a huddle board, according to another embodiment. In an example referring to FIG. 6, method 700 describes the operations performed in step 608 of method 600 in further detail. In this embodiment, a huddle board management module operating within a huddle management system of a huddle collaboration system, analyzes each huddle board from the list of huddle boards derived from the latest feed of data provided by a human resources database, to identify any modifications that have to be applied to the list of huddle boards. In this embodiment, the huddle board management module determines, based on this analysis, whether there is a need to create an entry for the huddle board in the electronic huddle board database. Further to this embodiment, the huddle board management module updates the name of the huddle board in the electronic huddle board database, when needed.

A plurality of steps included in method 700 may be performed by one or more computing devices such as, for example, computing device 200. Method 700 is implemented with components of the exemplary operating environments of FIGS. 1-5. The steps of method 700 are embodied in a computer readable medium containing computer readable code such that the steps are implemented when the computer readable code is executed by a computing device. In some implementations, certain steps of method 700 can be combined, performed simultaneously, or in a different order, without deviating from the objective of method 700.

Method 700 begins at step 702, when a huddle board management module selects a huddle board within the list of huddle boards derived from the latest data feed provided by a human resources database. In this embodiment, the huddle board management module analyzes the information related to the selected huddle board using data mining and other data processing tools, to determine if there is a corresponding huddle board in the list of huddle boards derived from the information stored in an electronic huddle board database. Method 700 then advances to step 704.

At step 704, the huddle board management module determines whether a first huddle board analyzed at step 702, has a corresponding huddle board in the list of huddle boards derived from the information stored in the electronic huddle board database. In this embodiment, the huddle board management module compares the list of huddle boards generated from the latest data feed provided by the human resources database, with the list of huddle boards generated from the information stored in the electronic huddle board database, to determine any modifications that need to be applied to the list of huddle boards. If there is no corresponding huddle board in the list of huddle boards derived from the information stored in the electronic huddle board database, then method 700 advances to step 706. Otherwise, method 700 advances to step 708.

At step 706, whenever the huddle board analyzed at step 702 does not have a corresponding huddle board in the list of huddle boards derived from the information stored in the electronic huddle board database, the huddle board management module creates a new huddle board for the huddle board analyzed at step 702 based on information derived from the latest data feed received. The process of creating a new huddle board includes linking one or more team members to the new huddle board when needed, and adding a "default" section to the huddle board. Method 700 then ends.

At step 708, whenever the huddle board analyzed at step 702 has a corresponding huddle board in the list of huddle boards derived from the information stored in the electronic huddle board database, the huddle board management module determines whether the name of the huddle board analyzed at step 702 has changed. If the name of the huddle board has not changed, then method 700 ends. Otherwise, method 700 advances to step 710.

At step 710, whenever the name of the huddle board analyzed at step 702 has changed, the huddle board management module updates the name field of the huddle board analyzed at step 702 within the electronic huddle board database, according to information derived from the latest data feed received. Then, method 700 ends.

Figure 8:
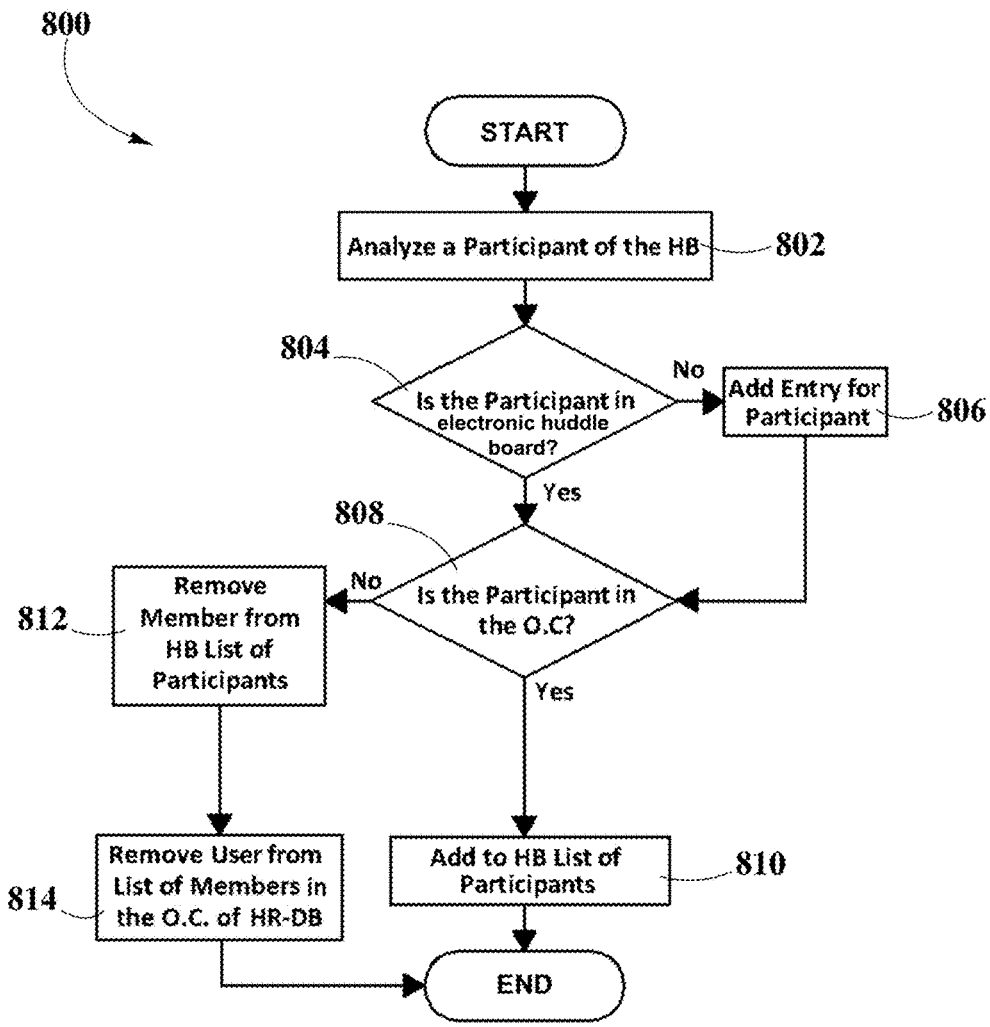
FIG. 8 is a flowchart of a method for automatically updating a list of huddle board participants, according to an embodiment.

FIG. 8 is a flowchart of a method 800 for automatically updating a list of huddle board participants, according to another embodiment. In an example referring to FIG. 6, method 800 describes in further detail the operations performed in step 612 of method 600. In this embodiment, a huddle board management module operating within a huddle management system of a huddle collaboration system analyzes each team member included within a list of huddle board participants derived from the latest feed of data provided by a human resources database. Further to this embodiment, the huddle board management module uses the list of participants obtained from information derived from an electronic huddle board database and the organizational chart of the company, to determine whether the team member should be included in the list of huddle board participants.

A plurality of steps included in method 800 may be performed by one or more computing devices such as, for example, computing device 200. Method 800 is implemented with components of the exemplary operating environments of FIGS. 1-5. The steps of method 800 are embodied in a computer readable medium containing computer readable code such that the steps are implemented when the computer readable code is executed by a computing device. In some implementations, certain steps of method 800 can be combined, performed simultaneously, or in a different order, without deviating from the objective of method 800.

Method 800 starts at step 802, when a huddle board management module selects a huddle board participant in the list of huddle board participants derived from the latest data feed provided by a human resources database. In this embodiment, the huddle board management module analyzes the information related to the selected huddle board participant using data mining and other data processing tools, to determine if the selected huddle board participant is included in the list of huddle board participants obtained from information stored in an electronic huddle board database. Method 800 then advances to step 804.

At step 804, the huddle board management module determines whether a first huddle board participant analyzed at step 802 is included in the list of huddle board participants obtained from information stored in the electronic huddle board database. In this embodiment, the huddle board management module compares the list of huddle board participants generated from the latest data feed provided by the human resources database, with the list of huddle board participants generated from the information stored in the electronic huddle board database, to determine any modifications that need to be applied to the list of huddle board participants. If the analyzed huddle board participant is not included in the list of huddle board participants generated from information stored in the electronic huddle board database, then method 800 advances to step 806. Otherwise, method 800 advances to step 808.

At step 806, whenever the huddle board participant analyzed at step 802 is not included in the list of huddle board participants generated from information stored in the electronic huddle board database, the huddle board management module adds an entry in the electronic huddle board database, for the huddle board participant analyzed at step 802. Method 800 then advances to step 808.

At step 808, the huddle board management module determines whether the huddle board participant analyzed in step 802, is in the organizational chart of the company which is stored in the internal database. In this embodiment, the huddle board management module determines if the huddle board participant's permissions within the huddle board need to be modified as a result of a change of the huddle board participant's position within the company. If the huddle board participant analyzed at step 802 is in the organizational chart of the company, then method 800 advances to step 810. Otherwise, method 800 advances to step 812.

At step 810, the huddle board management module adds the huddle board participant analyzed at step 802 to the list of participants of the huddle board; as a result the link between the huddle board and the huddle board participant in the electronic huddle board database, is automatically updated. In exemplary embodiments, whenever the huddle board participant analyzed at step 802 is a dotted line member who is now part of the huddle board per the organizational chart of the company, the huddle board management module adds the huddle board participant analyzed at step 802 to the list of participants of the huddle board, characterized as a real user; as a result the link between the huddle board and the huddle board participant in the electronic huddle board database, is automatically updated. Then, method 800 ends.

At step 812, whenever the huddle board participant analyzed at step 802 is not in the organizational chart of the company, the huddle board management module removes the huddle board participant from the list of huddle board participants; as a result the link between the huddle board and the huddle board participant in the electronic huddle board database, is automatically updated. Method 800 then advances to step 814.

At step 814, the huddle board management module removes the huddle board participant who was removed from the list of huddle board participants at step 812, from the list of members in the organizational chart of the human resources database. Then, method 800 ends.

In one embodiment, a system comprises an electronic huddle board data store configured to store a record of each huddle board; and a server communicatively coupled to the electronic huddle board data store and configured to identify one or more huddle board participants from a human resources data store who are identified in the electronic huddle board data store as being associated with at least one huddle board record, determine a permission level for each huddle board participant for each huddle board record, determine any changes to an organization chart retrieved from a data store, update each permission level for each huddle board participant for each huddle board record based upon any changes to the organization chart involving the huddle board participant, store each updated permission level in the electronic huddle board database, and transmit data describing how to render one or more huddle boards associated with the one or more huddle board records to a huddle board participant based upon the updated permission level.

In another embodiment, a computer-implemented method comprises generating, by a server, a record for each huddle board record derived from an electronic huddle board data store; obtaining, by the server, a set of records identifying one or more huddle board participants derived from a human resources data store who are identified in the electronic huddle board data store as being associated with at least one huddle board record; determining, by the server, a permission level for each huddle board participant for each huddle board record; determining, by the server, any changes to an organization chart retrieved from a data store; updating, by the server, each permission level for each huddle board participant for each huddle board record based upon any changes to the organization chart involving the huddle board participant; storing, by the server, each updated permission level in the electronic huddle board data store; and transmitting, by the server, data describing how to render one or more huddle boards associated with one or more huddle board records to a huddle board participant based upon the updated permission level.

In yet another embodiment, a computer implemented method comprises receiving, by a server, a request for a huddle board participant to access an electronic huddle board session; obtaining, by the server, a record of the huddle board participant from a human resources data store; querying, by the server, an electronic huddle board data store to determine whether the huddle board participant is entitled to access the electronic huddle board session; and updating, by the server, the electronic huddle board data store based upon changes in an organizational chart of a company employing the huddle board participant.

Example #1 refers to the update of a list of huddle board participants employing the methods described in FIGS. 6-8 which is implemented with components of the exemplary operating environments of FIGS. 1-5. An individual working for an automotive manufacturer, in a supervisory position in the finance department, has been promoted to a management position in the marketing department. As a result, his profile and the links between his profile and one or more huddle boards within the electronic huddle board database of the huddle collaboration system have been modified. Specifically, the present invention automatically updates the permission level of the individual so that the individual may access the huddle board of the marketing department in response to a detected change of the organizational chart reflecting the promotion of the individual to the management position in the marketing department.

Example #2 refers to the update of a team member's permissions in a huddle board employing the methods described in FIGS. 6-8 which is implemented with components of the exemplary operating environments of FIGS. 1-5. An individual working for an automotive manufacturer is included in the huddle board of the marketing department as a dotted line member because he does not officially work for the leader of the huddle board, according to the organizational chart of the company. However, as soon as the dotted line member becomes part of the marketing department per the organizational chart of the company through a change of his position within the company, the huddle board management module runs an automatic process to update the links between the team member's profile and one or more huddle boards in the electronic huddle board database; which includes the process of changing his dotted line member status in the huddle board of the marketing department to a real user status, among others. Specifically, the huddle board management module automatically updates the permission level of the team member so that the team member may access the huddle board of the marketing department in response to a detected change in the organizational chart reflecting the team member becoming part of the marketing department.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A system comprising:
an electronic data store configured to store a record of at least one collaborative graphical user interface; and
a server communicatively coupled to the electronic data store, a human resources data store, and an internal data store and configured to
identify one or more collaborative graphical user interface participants from the human resources data store, wherein the one or more collaborative graphical user interface participants are identified in the electronic data store as being associated with at least one collaborative graphical user interface record,
determine a permission level for each of the one or more collaborative graphical user interface participants for each of the at least one collaborative graphical user interface record,
determine changes to an organization chart retrieved from the internal data store,
update the permission level for each of the one or more collaborative graphical user interface participants for each of the at least one collaborative graphical user interface record based upon changes to the organization chart involving the one or more collaborative graphical user interface participants,
store each updated permission level in the electronic data store,
upon receiving a request from the one or more collaborative graphical user interface participants operating one or more computing devices, generate an electronic session for a web-based interaction between the one or more collaborative graphical user interface participants,
receive a credential of the one or more collaborative graphical user interface participants transmitted from their one or more computing devices;
validate the credential of the one or more collaborative graphical user interface participants; and
render one or more collaborative graphical user interfaces associated with the at least one collaborative graphical user interface record on a graphical user interface of at least one computing device of the one or more collaborative graphical user interface participants based upon the updated permission level for each of the one or more collaborative graphical user interface participants for each of the at least one collaborative graphical user interface record.

2. The system according to claim 1, wherein the server is further configured to grant access to the at least one collaborative graphical user interface for the one or more collaborative graphical user interface participants based upon the permission level for the one or more collaborative graphical user interface participants.

3. The system according to claim 1, wherein the server is further configured to deny access to the at least one collaborative graphical user interface for the one or more collaborative graphical user interface participants based upon the permission level for the one or more collaborative graphical user interface participants.

4. The system according to claim 1, wherein the server is further configured to determine the changes to the organization chart on a periodic basis.

5. The system according to claim 1, wherein the server is further configured to determine the changes to the organization chart in real time.

6. A computer-implemented method comprising:

generating, by a server, a record for each collaborative graphical user interface derived from an electronic data store operatively coupled to the server, thereby resulting in collaborative graphical user interface records;

obtaining, by the server, a set of records identifying one or more collaborative graphical user interface participants derived from a human resources data store operatively coupled to the server, wherein the one or more collaborative graphical user interface participants are identified in the electronic data store as being associated with at least one of the collaborative graphical user interface records;

determining, by the server, a permission level for each of the one or more collaborative graphical user interface participants for each of the collaborative graphical user interface records;

determining, by the server, changes to an organization chart retrieved from an internal data store operatively coupled to the server;

updating, by the server, the permission level for each of the one or more collaborative graphical user interface participants for each of the collaborative graphical user interface records based upon changes to the organization chart involving the one or more collaborative graphical user interface participants;

storing, by the server, each updated permission level in the electronic data store;

upon receiving a request from the one or more collaborative graphical user interface participants operating one or more computing devices, generating by the server, an electronic session for a web-based interaction between the one or more collaborative graphical user interface participants;

receiving, by the server, a credential of the one or more collaborative graphical user interface participants transmitted from their one or more computing devices;

validating, by the server, the credential of the one or more collaborative graphical user interface participants; and rendering, by the server, one or more collaborative graphical user interfaces associated with the collaborative graphical user interface records to on a graphical user interface of the one or more computing devices of the one or more collaborative graphical user interface participants based upon the updated permission level for each of the one or more collaborative graphical user interface participants for each of the collaborative graphical user interface records.

7. The method according to claim 6, wherein updating the permission level for each of the one or more collaborative graphical user interface participants for each of the collaborative graphical user interface records comprises granting, by the server, access to each collaborative graphical user interface derived from the electronic data store for the one or more collaborative graphical user interface participants based upon the permission level for the one or more collaborative graphical user interface participants.

8. The method according to claim 6, wherein updating the permission level for each of the one or more collaborative graphical user interface participants for each of the collaborative graphical user interface records comprises denying, by the server, access to each collaborative graphical user interface derived from the electronic data store for the one or more collaborative graphical user interface participants based upon the permission level for the one or more collaborative graphical user interface participants.

9. The method according to claim 6, wherein updating the permission level for each of the one or more collaborative graphical user interface participants for each of the collaborative graphical user interface records comprises maintaining, by the server, the permission level for the one or more collaborative graphical user interface participants when a role of the one or more collaborative graphical user interface participants on the organization chart has not changed.

10. The method according to claim 6, wherein determining the changes to the organization chart occurs on a periodic basis.

11. The method according to claim 10, wherein the periodic basis is daily.

12. The method according to claim 6, wherein determining the changes to the organization chart occurs in real time.

13. The method according to claim 6, further comprising associating, by the server, each record for each collaborative graphical user interface derived from the electronic data store with a permission level for access for each of the one or more collaborative graphical user interface participants.

14. A computer implemented method comprising:

receiving, by a server, a request for a collaborative graphical user interface participant to access an electronic session;

obtaining, by the server, a credential record of the collaborative graphical user interface participant from a human resources data store operatively coupled to the server;

querying, by the server, an electronic data store operatively coupled to the server to determine whether the collaborative graphical user interface participant is entitled to access the electronic session;

validating, by the server, the credential record of the collaborative graphical user interface participant based on a response to the query;

generating, by the server, the electronic session for a web-based interaction between the collaborative graphical user interface participant and one or more other participants;

updating, by the server, the electronic data store based upon changes in an organizational chart of a company employing the collaborative graphical user interface participant;

updating, by the server, a permission level for the collaborative graphical user interface participant for at least one collaborative graphical user interface record based upon changes to the organization chart involving collaborative graphical user interface participant, and render one or more collaborative graphical user interfaces associated with the at least one collaborative graphical user interface record on a graphical user interface of a computing device of the collaborative graphical user interface participant based upon the updated permission level for the collaborative graphical user interface participant for the at least one collaborative graphical user interface record.

15. The method according to claim 14, wherein updating the electronic data store comprises granting, by the server, access to the electronic session for the collaborative graphical user interface participant based upon the changes in the organizational chart.

16. The method according to claim 14, wherein updating the electronic data store comprises denying, by the server, access to the electronic session for the collaborative graphical user interface participant based upon the changes in the organizational chart.

17. The method according to claim 14, wherein updating the electronic data store comprises maintaining, by the server, a permission level for the collaborative graphical user interface participant when a role of the collaborative graphical user interface participant on the organization chart has not changed.

18. The method according to claim 14, wherein updating the electronic data store based upon changes to the organization chart occurs on a periodic basis.

19. The method according to claim 14, wherein updating the electronic data store based upon changes to the organization chart occurs in real time.

20. The method according to claim 14, further comprising associating, by the server, each record of the electronic session with a permission level for access to the electronic session for the collaborative graphical user interface participant.

* * * * *